US007950004B2

(12) United States Patent
Vieira et al.

(10) Patent No.: US 7,950,004 B2
(45) Date of Patent: May 24, 2011

(54) DEVICES SYSTEMS AND METHODS FOR TESTING SOFTWARE

(75) Inventors: Marlon E. R. Vieira, East Windsor, NJ (US); Gerrit Hanselmann, Neuweiler (DE)

(73) Assignee: Siemens Corporation, Iselin, NJ (US)

( * ) Notice: Subject to any disclaimer, the term of this patent is extended or adjusted under 35 U.S.C. 154(b) by 1255 days.

(21) Appl. No.: 11/549,741

(22) Filed: Oct. 16, 2006

(65) Prior Publication Data

US 2007/0220342 A1    Sep. 20, 2007

Related U.S. Application Data

(60) Provisional application No. 60/729,257, filed on Oct. 21, 2005.

(51) Int. Cl.
*G06F 9/44* (2006.01)
*G06F 11/00* (2006.01)
(52) U.S. Cl. .............................. 717/125; 714/25; 714/38
(58) Field of Classification Search ........................ None
See application file for complete search history.

(56) References Cited

U.S. PATENT DOCUMENTS

| | | | | |
|---|---|---|---|---|
| 5,493,689 | A * | 2/1996 | Waclawsky et al. | 710/1 |
| 5,892,947 | A | 4/1999 | DeLong et al. | |
| 6,421,822 | B1 | 7/2002 | Pavela | |
| 6,505,342 | B1 | 1/2003 | Hartmann et al. | |
| 6,732,357 | B1 * | 5/2004 | Berry et al. | 717/158 |
| 6,751,789 | B1 * | 6/2004 | Berry et al. | 717/130 |
| 6,922,828 | B1 * | 7/2005 | Alexander et al. | 717/144 |

OTHER PUBLICATIONS

Matthias Riebisch et al., UML-Based Statistical Test Case Generation [online], 2002, [retrieved on Mar. 22, 2011]. Retrieved from the Internet: <URL: http://portal.acm.org/citation.cfm?id=744220>.*
Matthijs Wessels, High level performance analysis and dependency management [online], 2010, [retrieved on Mar. 22, 2011], pp. 1-65. Retrieved from the Internet: <URL: http://alexandria.tue.nl/extra1/afstversl/wsk-i/wessels2010.pdf>.*
Briand, et al. "A UML-Based Approach to System Testing," *Springer-Verlag*, 12 (2002).
CHOPRA, "Programming with XML Beans," (2004) http://www.106.ibm.com/developerworks/library/x-beams1/.
ECLIPSE, "Eclipse Technology—Hyades Project," (2005) http://eclipse.org/tptp/home/archives/hyades/project_info/hyades.html.
Gelperin, et al. "The Growth of Software Testing," *Communications of the ACM*, (1998) 31:6 pp. 687-695.
Gross, et al., "Modeling and Implementation of Built-In Contract Tests," *IESE-Report*, No. 122.03/E Version 1.0 Fraunhofer IESE (2003).
Hartmann, et al., "A UML-based Approach to System Testing," *NASA Journal of Innovations in Systems and Software Engineering*, (2005).
KANER, 'Pitfalls and Strategies in Automated Testing, *Computer*, (1997) pp. 114-116.

(Continued)

*Primary Examiner* — Tuan Q Dam
*Assistant Examiner* — Hanh T Bui

(57) ABSTRACT

Certain exemplary embodiments comprise a method comprising rendering a verdict indicative of whether a predetermined software system functions in a predetermined manner. The verdict can be determined based upon machine instructions. The machine instructions can be automatically generated via a module adapted to parse and/or load an Extensible Markup Language XML file indicative of a test case.

10 Claims, 5 Drawing Sheets

OTHER PUBLICATIONS

KOREL, "Automated Test Data Generation for Programs with Procedures," *International Symposium Software Testing and Analysis*, (1996).

Offutt, et al., "Testing Object-Oriented Software Using the Category-Partition Method," *Seventeenth International Conference on Technology of Object-Oriented Languages and Systems*, (1995) 293-304.

OMG, "UML 2.0 Superstructure Specification," OMG Revised Final Adopted Specification ptc/04-10-02, (2004) *Object Management Group, Inc.*

OMG, "UML 2.0 Testing Profile Specification,"OMG Adopted Specification pro/03=08-03, (2003) *Object Management Group, Inc.*, http://www.omg.org/docs/ptc/04-04-02.pdf.

Ostrand, et al., "The Category-Partition Method for Specifying and Generating functional Tests," *Communications of the ACM*, 31:6 )1988) pp. 676-686.

Schieferdecker, et al. "The UML 2.0 Testing Profile and its Relation to TTCN-3," Fraunhofer FOKUS, Berlin, Germany (2003).

W3C, "SML Schema,"W3C, (2004) http;//www.w3.org/XML/Scheme.

* cited by examiner

DEVICES SYSTEMS AND METHODS FOR TESTING SOFTWARE

CROSS-REFERENCES TO RELATED APPLICATIONS

This application claims priority to, and incorporates by reference herein in its entirety, pending U.S. Provisional Patent Application Ser. No. 60/729,257, filed 21 Oct. 2005.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments comprise a method comprising rendering a verdict indicative of whether a predetermined software system functions in a predetermined manner. The verdict can be determined based upon machine instructions. The machine instructions can be automatically generated via a module adapted to parse and/or load an Extensible Markup Language XML file indicative of a test case.

Figure 1:
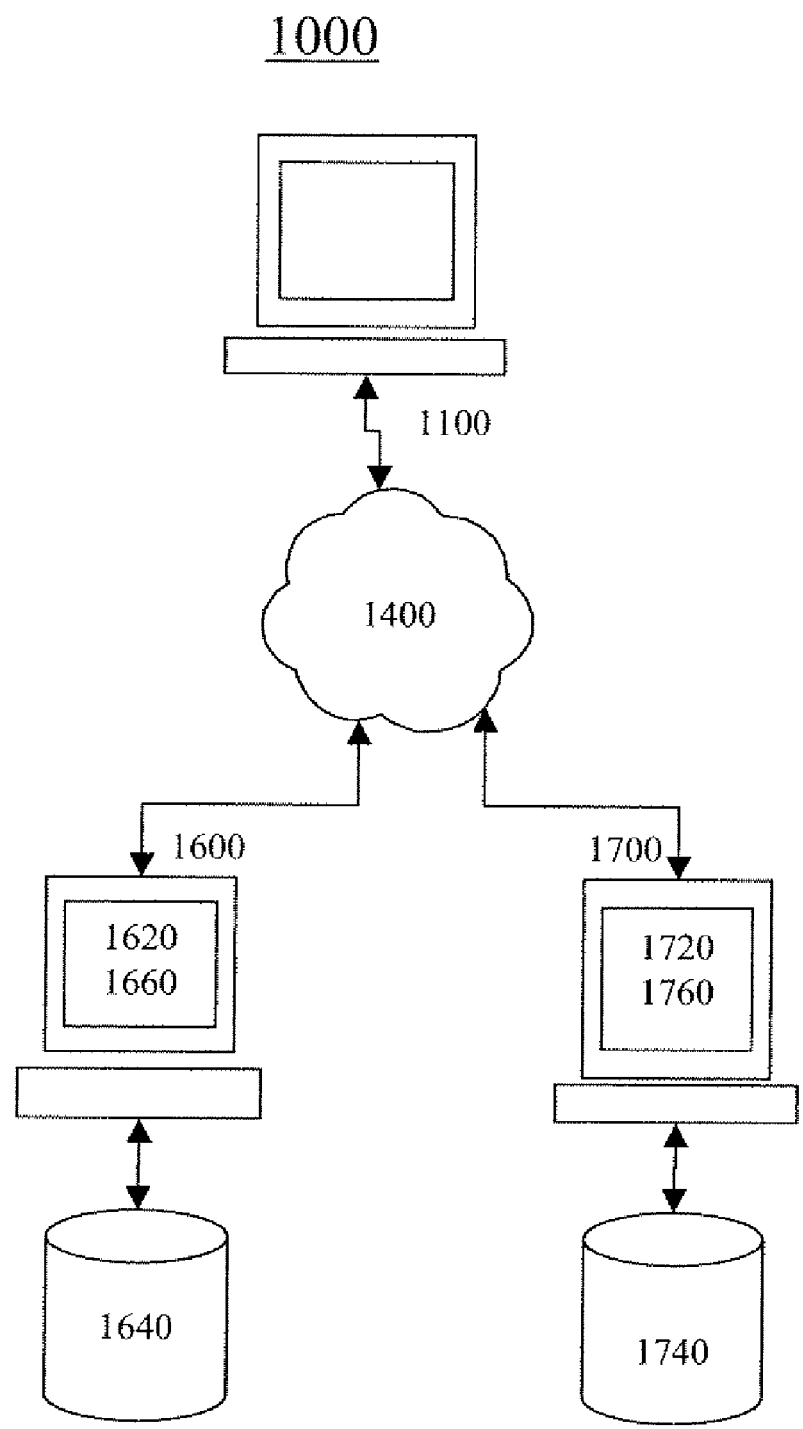
FIG. 1 is a block diagram of an exemplary embodiment of a system 1000.

FIG. 1 is a block diagram of an exemplary embodiment of a system 1000, which can comprise an information device 1100. Information device 1100 can be communicatively coupled to a plurality of information devices via a network 1400. For example, an information device 1600 and/or an information device 1700 can be communicatively coupled to information device 1100 and/or each other. Information device 1600 can be adapted to develop a predetermined software system. Information device 1600 can comprise a user interface 1620 and a user program 1660. User program 1660 can be adapted to provide computer assisted software engineering functions adapted to develop the predetermined software system. User interface 1620 can be adapted to render information related to developing the predetermined software system. Information device 1600 can be communicatively coupled to a memory device 1640, which can be adapted to store the predetermined software system and/or information related thereto.

In certain exemplary embodiments, information device 1700 can comprise a user program 1760, which can be adapted to generate and/or provide one or more test cases adapted to evaluate and/or determine a verdict regarding performance of the predetermined software system. Information device 1700 can comprise a user interface 1720, which can be adapted to render information related to the one or more test cases. Information device 1700 can be communicatively coupled to a memory device 1740, which can be adapted to store the one or more test cases and/or information related thereto. In certain exemplary embodiments, the predetermined software system can be developed and/or the one or more test cases can be generated and/or provided by a single information device. In certain exemplary embodiments, the predetermined software system can be developed and/or the one or more test cases can each be generated and/or provided by a plurality of information device.

Figure 2:
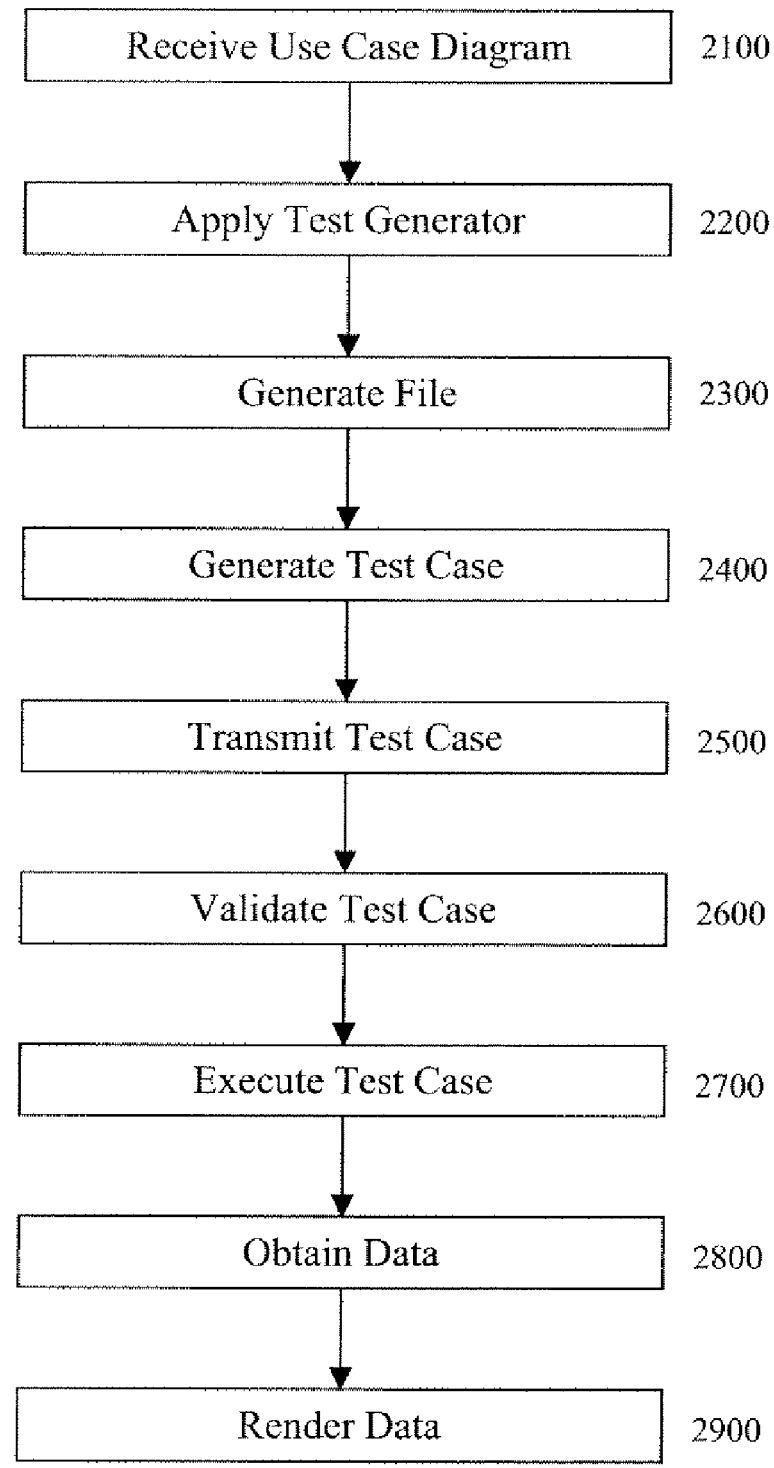
FIG. 2 is a flowchart of an exemplary embodiment of a method 2000.

FIG. 2 is a flowchart of an exemplary embodiment of a method 2000. At activity 2100, a use case diagram can be developed, provided, and/or received. The use case diagram can be related to a predetermined software system. The use case diagram can be compliant with a Unified Modeling Language (UML) testing profile and/or standard. In certain exemplary embodiments, a Unified Modeling Language (UML) testing profile can be established. The UML testing profile can be adapted to test the predetermined software system. The use case diagram and/or the UML testing profile can be developed, provided, and/or received at any phase of a software development process, such as prior to software development, during an initial stage of software development, during a testing phase of software development, and/or at a release stage of software development.

At activity 2200, a test generator can be applied to the use case diagram. The test generator can be adapted to refine the use case diagram via an activity model and a sequence diagram to determine a test case. The test case can be adapted to test the predetermined software system. Each of the use activity model and/or the sequence diagram can be compliant with a Unified Modeling Language (UML) testing profile and/or standard. In certain exemplary embodiments, the UML testing profile can comprise the test case.

At activity 2300, an XML file indicative of the test case can be generated manually and/or automatically. The XML file can comprise predetermined structural characteristics, which can comprise:

a structure adapted to obtain statistical information during a test of the predetermined software system, the statistical information can comprise a number of paths and/or a number of tests;

a structure adapted to obtain output from the predetermined software system during the test of the predetermined software system; and/or architectural information related to a structure of the test case and an identification of components taking part in the test, the architectural information can comprise definition of a test case structure and/or identification of software, firmware, and/or hardware components taking part in the test of the predetermined software system;

behavioral information regarding the test of the predetermined software system; and/or information regarding organization of an XML data structure associated with the XML file.

At activity 2400, a test case and/or machine instructions of the test case can be generated. The test case and/or machine instructions can be generated automatically in a predetermined programming language via a plurality of modules that can comprise:

a first module adapted to parse and load the XML file;

a second module adapted to create a programming language independent object model based upon the XML file;

a third module adapted to produce the machine instructions in the predetermined programming language;

a fourth module adapted to compile and build the machine instructions associated with the test case, the fourth module adapted to initialize components of the test case in a file; and/or a fifth module adapted to execute the machine instructions, the fifth module adapted to log results obtained from the predetermined software system.

In certain exemplary embodiments, the predetermined programming language can be Pascal, C, C+, C++, awk, Simula, Eiffel, Smalltalk, XML, Tree and Tabular Combined Notation-3 (TTCN-3), Ruby, Java, Lisp, Visual Basic for Applications (VBA), Perl, JUnit, and/or A Programming Language (APL), etc.

At activity 2500, the test case and/or machine instructions can be transmitted via a signal. Certain exemplary embodiments can be adapted to cause the test case and/or machine instructions to be transmitted as a signal to an information device adapted to execute the test case and/or machine instructions.

At activity 2600, the test case can be validated manually and/or automatically. For example, the test case can be compared to predetermined criteria to establish compliance with one or more standards. In certain exemplary embodiments, the test case can be examined by an automatic compiler and/or interpreter adapted to determine syntactical errors therein. In certain exemplary embodiments, the validation action can comprise evaluating a status of an execution of the test case and/or machine instructions via data provided by and/or obtained from the predetermined software system.

At activity 2700, the predetermined software system, test case, and/or machine instructions can be executed via an information device. In certain exemplary embodiments, the predetermined software system can be executed with the test case and/or machine instruction providing inputs and/or an environment for execution.

At activity 2800, data and/or a renderable verdict can be generated and/or obtained from the predetermined software system, and/or an information device related thereto, responsive to activity 2700. The verdict can be adapted to be analyzed by an Arbiter. The verdict can be indicative of whether the predetermined software system functioned in a predetermined manner responsive the test case and/or machine instructions.

At activity 2900, the data, a verdict associated with the data, and/or information derived from the data can be rendered via a user interface.

In certain exemplary software systems testing can be an important consideration. A Unified Modeling Language (UML) testing profile can be adapted for relatively early consideration and tight integration of test aspects in software development. In certain exemplary embodiments, a Test Development Environment (TDE/UML) can be adapted to enable automated generation of multiple test cases from system use cases.

Certain exemplary embodiments can be adapted to generate and/or execute tests based on an integration of the UML testing profile into TDE/UML. Certain exemplary embodiments can be adapted to reduce costs of test automation, yet provide test automation benefits.

Tight time schedules and/or a desire for software security can make automated software testing desirable. Certain exemplary embodiments can comprise testing from an initial phase of a software development process, and/or providing a means to facilitate test automation.

Certain exemplary embodiments can comprise harnessing tests based on a UML testing profile and TDE/UML. Certain exemplary embodiments can comprise integrating the testing profile into TDE/UML and/or utilizing a code generator that produces and executes tests. Such embodiments can be described as harness test cases. A test harness can be a system that can start a System Under Test (SUT), send test messages to the SUT, and/or evaluate test pass/no pass results.

The Unified Modeling Language (UML) is an industry standard for specifying software, created under the auspices of the Object Management Group (OMG). UML can be adapted to allow a model to be constructed, analyzed, and manipulated in a standard way at analysis and/or design time. In certain exemplary embodiments, UML can provide extension mechanisms like stereotypes, tagged values, and constraints. A profile can be a collection of such extensions that together describe a particular modeling problem and can facilitate modeling constructs in a specific domain. A UML 2.0 testing profile (U2TP) is such an extension of the UML, which can be adapted for use in the testing domain. U2TP can provide various concepts to employ UML for test specification and/or design. Since UML can be utilized in certain exemplary software development projects from an initial phase, U2TP can be utilized for testing at the initial phase of a software development project. In certain exemplary embodiments, U2TP can be applied to enhance TDE/UML with information adapted to generate executable tests.

TDE/UML is an exemplary algorithm for creating test cases based on UML one or more use cases, corresponding activity diagrams, and/or annotations. TDE/UML is an exemplary extension of the test development environment (TDE), which can be based on a category partition method.

Test automation can be associated with capture/reply mechanisms, which can involve efforts of a tester. In certain exemplary embodiments, capture/reply can be adapted to allow testing at an end of a software development cycle. In certain exemplary embodiments, TDE/UML can be adapted to allow a creation of test cases from a system specification. TDE/UML can be adapted to automate and/or formalize a process of test design, generation, and/or execution, in order to deliver relatively systematic and efficient system testing.

The UML testing profile can consider test aspects from a beginning of software development and might achieve tight integration of software testing in a development process. In certain exemplary embodiments, the UML testing profile can be adapted for test modeling and/or design. A Testing and Test Control Notation (TTCN) can be a test specification language. In certain exemplary embodiments, TTCN-3 can comprise a runtime environment that, via requesting further work, can enable automated execution of the designed tests.

U2TP is a language that can be utilized for designing, visualizing, specifying, analyzing, constructing, and/or documenting artifacts of test systems. U2TP can be adapted to support automated testing of system implementations according to computational UML models. U2TP can be adapted for the specification of conformance requirements and conformance testing and/or functional black box testing procedures.

A testing profile can extend UML with test specific concepts such as test components and/or verdicts, etc. The testing profile can group such concepts into logical parts that can comprise: test architecture, test behavior, test data, and time.

An architectural part can comprise a set of concepts to specify structural aspects of a test context covering the System Under Test (SUT), test components, and/or test configuration, etc.

Test components can be active entities that realize the behavior of a test case. A test component can be a class of a test system that has a set of interfaces via which the test component can communicate via a connection with other test components and/or with the SUT. A test component can also perform a validation action, which can be retrieved by an arbiter.

The SUT can be a system, subsystem, or component being tested. The SUT can comprise several objects and can be exercised via a public interface operations and signals by test components. The SUT can be a black box in which a public interface is known.

The arbiter can be adapted to assess a final verdict for a test case and/or a test context. The Arbiter can assess a property of a test case or a test context. The arbiter can be assigned different arbitration strategies, however a default can comprise verdicts such as Pass, Inconclusive, Fail, and/or Error, etc. The arbiter can retrieve the verdict of each single test component and/or assess an overall verdict.

A Test Context can be a collection of test cases together with a test configuration, which can be a collection of test component objects and connections between these objects and the SUT.

Utility parts can be miscellaneous components that can help the test components to realize test behavior.

A behavioral part can comprise a set of concepts to specify test behavior, the objectives thereof, and/or the evaluation of SUT. The behavioral part can be adapted to describe test cases as intercommunication of test components amongst the test components and/or with the SUT, and can provide a means to describe test evaluation, such as verdicts and/or validation actions, etc.

The test objective can describe the aim, purpose, and/or intention of a test. The test objective can be associated with a test case and can reflect what can and/or should be tested, with what anticipated result, and/or why the anticipated result is expected.

A test case can comprise a specification of one case to test the SUT. The test case can comprise information regarding what to test, with which input, with what expected result, and/or under which condition. The test case can use a technical specification of how the SUT should be tested, i.e. the test behavior. The test case can be the implementation of a test objective. The test case can be a property of a test context specifying how a set of cooperating test components interact with the SUT to realize a test objective. The test case can use an arbiter to evaluate a test result. Thereby, each test component can maintain a corresponding local verdict. Each local verdict can be sampled by the arbiter to assess an overall verdict for the test case.

A verdict can be an assessment of correctness of the SUT. Test cases can yield verdicts. The testing profile can result in verdicts that comprise:
Pass: implies SUT might have behaved according to specification;
Inconclusive: implies that a determination might not have been made as to whether the SUT performed according to specification or not;
Fail: implies that the SUT might not have behaved according to the specification; and
Error: implies that a determination has been made of a failure other than the SUT.

A validation action can be an action to evaluate the status of the execution of a test scenario by assessing the SUT observations and/or additional parameters of the SUT. The validation action can be performed by a test component and can set a local verdict of the test component.

Observations and stimuli can be the data sent and received from the SUT respectively. Observations and stimuli can be viable for logging actions. In certain exemplary embodiments, observations and stimuli can be logged, transmitted, stored, and/or recorded automatically.

Defaults can be executed by test components and can be triggered by a test observation that is not handled in the behavior of a test case directly. In certain exemplary embodiments, a test case can describe an expected behavior for the SUT. However, if unexpected test behavior is observed during test execution, then a default handler can be applied. Defaults can be used to complete the test definition. Defaults can be defined hierarchically and can be added to single events, test components or complete tests.

In certain exemplary embodiments, U2TP can define a principal constituent, but might not provide all details of the test. In certain exemplary embodiments, the testing profile can provide a description of a test case at an abstract level that can be independent of realization technologies. In certain exemplary embodiments, a UML testing profile can reflect concepts of testing approaches for UML such as TTCN-3. In certain exemplary embodiments, TTCN-3 can comprise a mapping that can serve as a basis for harnessing U2TP models.

Certain exemplary embodiments can be adapted to harness tests in a relatively seamless manner. Certain exemplary embodiments can be adapted to create executable tests from the models, including test case generation by means of TDE/UML.

Since the testing profile can, and/or ought to, be on an abstract level, independent on the realization technologies, the testing profile might not consider initialization and setup issues of a test. Yet, preliminary to the test execution, the components included in the test case can be initialized. The SUT as well as test components and possibly utility parts can be started. Test control and test invocation might be suitable as far as test cases are concerned. However, the technical realization of the test cases, which can be performed between test components and the SUT, can be ignored by U2TP. Furthermore, the components participating in a test case can be set up for communication as well initialized. The components can be adapted to communicate between each other and with the SUT. Also the SUT can be aware of particular test components, for the SUT might have to communicate with the particular test components. Since the SUT can be a black box, certain exemplary embodiments can utilize knowledge of the SUT interface. The knowledge can comprise information about the initialization and configuration of the SUT.

The possible inquiries of test component functions through the SUT can result in a test component, which emulates an existing part of the system, providing certain functionality and/or acting as a stub component. The testing profile can consider test components entirely as stub objects. In certain exemplary embodiments, a test component can provide functionality as well.

Test data and related topics like stimulus and observation can impede a total automation of tests. This might not be a particular problem of the testing profile. The testing profile suggests some methods to model the data that can utilize stimuli and observations.

In certain exemplary embodiments, defaults can be utilized to model certain aspects of a test, even unexpected behavior. However, the profile might not suggest how to employ such a tool. Samples presented in the specification can apply to timing constraints, i.e. if a specific time is exceeded a default is triggered.

Although, the arbiter should enable the use of different arbitration strategies, the specification might not specify how the arbiter can be realized.

U2TP can be adapted to provide the description of a test case on an abstract level that is independent on the realization technologies. U2TP can be adapted to allow capturing certain information for black box test approaches to evaluate a correctness of system implementations. The intended independency on the realization technologies, though, can collide with an immediate generation of executable test scripts based on models. Conversely, a more precise modeling might counteract such a problem and allow a creation of such test scripts.

Still, U2TP proposes and advertises some methodologies without unfolding the application thereof, which can obstruct an employment of certain technologies proposed by the profile, such as defaults.

Certain exemplary embodiments can comprise an automated creation of executable tests from a system specification, which can be TDE/UML and/or U2TP. Certain exemplary embodiments can incorporate U2TP into TDE/UML to capture information adapted for generating executable tests.

Figure 3:
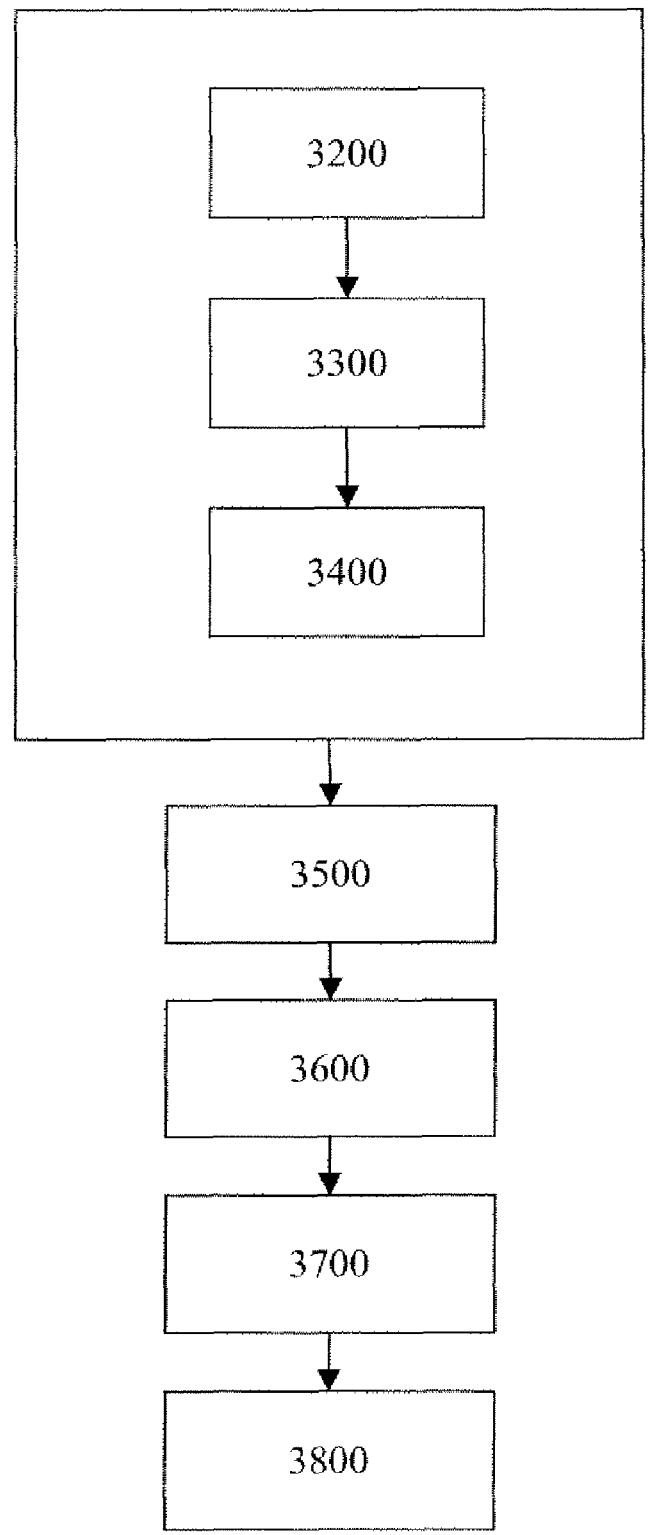
FIG. 3 is a block diagram of an exemplary embodiment of a method 3000.

FIG. 3 is a block diagram of an exemplary embodiment of a generation process. The process can employ TDE/UML 3500 for creating test cases 3600 from a system specification. In certain exemplary embodiments, TDE/UML 3500 can and/or should work according to a specification thereof. TDE/UML 3500 can be adapted to utilize case diagrams 3200, which can be refined with activity diagrams 3500 via test generator 3100 to create test cases 3600 from a refined system specification. Created test cases 3600 might not contain sufficient information to make created test cases 3600 executable. The created test cases 3600 can be used along with capture/reply tools to create executable tests 3800.

Certain exemplary embodiments can incorporate U2TP to receive information. Certain exemplary embodiments can refine activity diagrams with sequence diagrams 3400 on the U2TP standard in order to have the activities comprise information adapted for use in code generation. Certain exemplary activities can comprise a description of a behavior. With behavioral information a code generator 3700 can be capable of creating and executing test cases 3600 created by TDE/UML 3500. In certain exemplary embodiments, TDE/UML 3500 can utilize produced test cases 3600 that embrace more information than might be recognized by U2TP. Such test cases can be stored in an XML data structure, which is adapted for storage of test cases 3600. Using such an XML data structure, code generator 3700 can produce and/or execute the tests.

Code generator 3700 can comprise a generic interface that allows the generation of tests for different target programming languages. New target languages can be added during run time.

In certain exemplary embodiments, U2TP models can utilize further information to harness such models and to utilize certain features that U2TP advertises. Conversely, U2TP can be incorporated in TDE/UML 3500 to integrate the approach with a beginning of a software development process. Thus, modeling suggestions can be split into two parts, integrating U2TP in TDE/UML 3500 and enhancing U2TP, in order to employ U2TP for test harness, namely generating and executing tests.

U2TP can delineate test behavior with a test case defined in terms of sequences, alternatives, loops, and/or defaults of stimuli to and observations from the SUT. Test evaluation can be provided by concepts like verdicts, validation actions, arbiter, etc. TDE/UML 3500 can employ UML use case diagrams 3200 and activity diagrams 3300 for generating test cases 3600 from refined system specification. Thereby TDE/UML 3500 can combine graph with data coverage. Graph coverage can be achieved through different coverage criteria for activity diagrams 3300, which can describe use case diagrams 3200. Considering the activities as different steps of a test, can lead to activities that comprise information that can be utilized to execute a test. Such information can be captured in activities by embedding U2TP sequence diagrams in the respective activities. In certain exemplary embodiments, U2TP can allow the use of an interaction diagram for modeling test behavior. Certain exemplary embodiments can employ sequence diagrams 3400, for sequence diagrams 3400 can be utilized for describing test behavior. Sequence diagrams 3400 can be interaction diagrams that emphasize a time ordering of messages.

Figure 4:
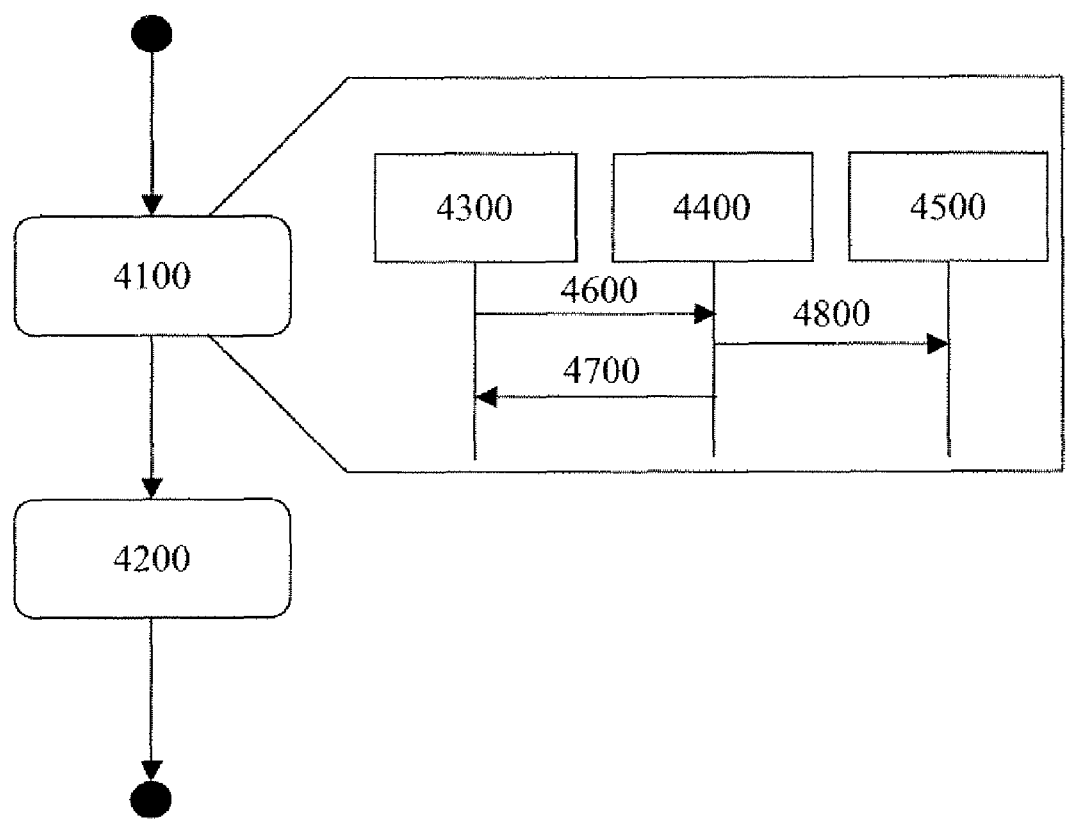
FIG. 4 is a block diagram of an exemplary embodiment of a method 4000.

FIG. 4 illustrates the integration of sequence diagrams into activities. Certain exemplary embodiments can utilize integration for embedding information about test behavior in activities. FIG. 4 illustrates a sequence that describes an activity Geometric mean 4100. Also, FIG. 4 delivers insight into modeling with U2TP. The depicted test comprises two test components that interact with the SUT 4400 comprising a math library.

In certain exemplary embodiments, U2TP beholds test components as stubs. In certain exemplary embodiments, test components can implement some functionality as well. In certain exemplary embodiments, a user can select whether a component is stub, implement existing functionality, and/or if the component can be utilized for test purposes. To support such an approach the components can be marked as to whether the test component is to implement existing functionality and/or is created for test purpose. In certain exemplary embodiments, a note adherent to the specific component can be utilized to indicate the selection of the user. In certain exemplary embodiments, components to be created can be marked with a note.

FIG. 4 is a block diagram of an exemplary embodiment of a method 4000. An initial method call can be performed by an added activity that can be recognizable by a name. In certain exemplary embodiments, methods that are called by SUT 4400 can be modeled, in order to evaluate certain exemplary tests. Method 4000 can comprise an arithmetic mean 4200.

In certain exemplary embodiments, method 4000 can comprise a geometric test component 4300 and/or a display test component 4500. Geometric test component 4300 can be adapted to provide a proceed instruction 4600 to SUT 4400 in order to calculate a geometric mean. SUT 4400 can be adapted to provide a result 4700 to geometric test component 4300 and/or an instruction 4800 to display the result to display test component 4500.

Certain exemplary embodiments of tests created via TDE/UML can utilize a data structure capable of storing test information.

Certain exemplary embodiments can utilize the eXtensible Markup Language (XML). XML can separate structure/syntax, content, and/or presentation. Certain exemplary embodiments can employ an XML schema to define the data structure. Certain exemplary embodiments can draw on XMLSpy to create the schema.

To be concise and meet the different needs the schema can be divided into five parts, which can respectively define:
 a structure for statistical information;
 a simple TDE/UML output that might lack certain execution information;
 architectural information;
 behavioral information; and/or
 organize sub-parts.

The statistical information can comprise data about a number of paths and/or number of generated test cases, etc. The statistical information can be affiliated to the simple TDE/UML output that describes the activities and the associated actors of a test case.

The architectural structure can reflect U2TP architectural concepts. The architectural structure can define the structure of the test case, the partaking components, and so on. Conversely, the behavioral part can be associated with U2TP behavioral concepts. The behavioral part can define the structure for the test behavior, like stimuli, observations, validation actions, etc.

Blending sub-parts together the global schema might not have further functionality. The global schema can define the entire data structure.

Apache's XMLBeans can be used to write and read the XML file. XMLBeans can access the XML schema via a Java compatible interface. Based on the created data structure, namely the XML schema, XMLBeans can create an object model for the XML schema. Therewith, data comprised by an XML document can be accessed and/or manipulated using Java classes.

In certain exemplary embodiments, the code generation process can be divided into five self-contained steps:
- the XML file can be parsed and/or loaded;
- a programming language independent object model can be created;
- using the object model, code can be produced in a definitive target programming language;
- using the produced code, compile and build the test code; and/or
- using the produced code, executing the built test application.

The test application can be adapted to harness the test (e.g., starting SUT 4400, sending messages to, and/or receiving messages from SUT 4400, etc.). A separation of the steps can be utilized to produce code for different target languages.

Such a separation can be reflected in code design. Thus, the code can be separated into five independent components, which can be structured in independent components. Certain exemplary embodiments can allow switching a target language at runtime without changing remaining code. In certain exemplary embodiments an interface can be implemented that writes the new target code, which can be added to the code generation process. Certain exemplary embodiments can exchange other components of the code as well without affecting other components.

In certain exemplary embodiments, each component can be adapted to provide functionality via respective interfaces to other components. A general component can encapsulate certain functionality and deliver the functionality to a user interface, sustaining different GUTs.

A direct compilation and build of generated code can allow for a treatment of errors. Since the initialization and/or compiling of the component in a test might entail errors, the code generator can be adapted to recognize, correct, and/or present such errors to the user. Having the initialization of the components contained in one file also might reduce rework of the generated code. Being able to execute the produced test can enable the code generator to harness the test. The user can provide the path of SUT 4400, further test components, and/or utility parts.

The structure of the generated code can be based on the target language Java. Preliminary to the creation of target code, the code generator can be adapted to build an object model. However, the object model might only reflect a behavior of a test case. Logging and arbitration can be target language specific solutions. The target Java code can be structured in five packages. Two packages can comprise the U2TP environment including arbiter, verdicts, logging, etc. The two packages can form a global structure of target code.

Logging can be based on Apache log 4j. Although log 4j can be designated for logging while development, log 4j can be adapted for logging in a test context as well. Therefore, log 4j can be extended with logging levels for test purposes like SUT, TRACE, VALIDATION ACTION, and so on. Logging can be added to each test component that realizes real functionality. Each communication with and/or from SUT 4400 can be logged as well as each communication between the test component and/or utility parts. The application can comprise a logging level adapted to encircle test application errors.

The generated code can comprise a test context, which can also comprise a main test application and a graphic user interface (GUI). The GUI can represent the results of the test cases and test components, namely their verdicts, and/or the gathered logging messages. Also the test context can be adapted to handle test invocation, e.g., starting the different test cases that belong to the specific context. To attain a stable execution of the test cases, each test case can be executed in a distinct, separate, independent, and/or proprietary thread, which can improve execution of certain test cases, even though one test case might not perform well.

Figure 5:
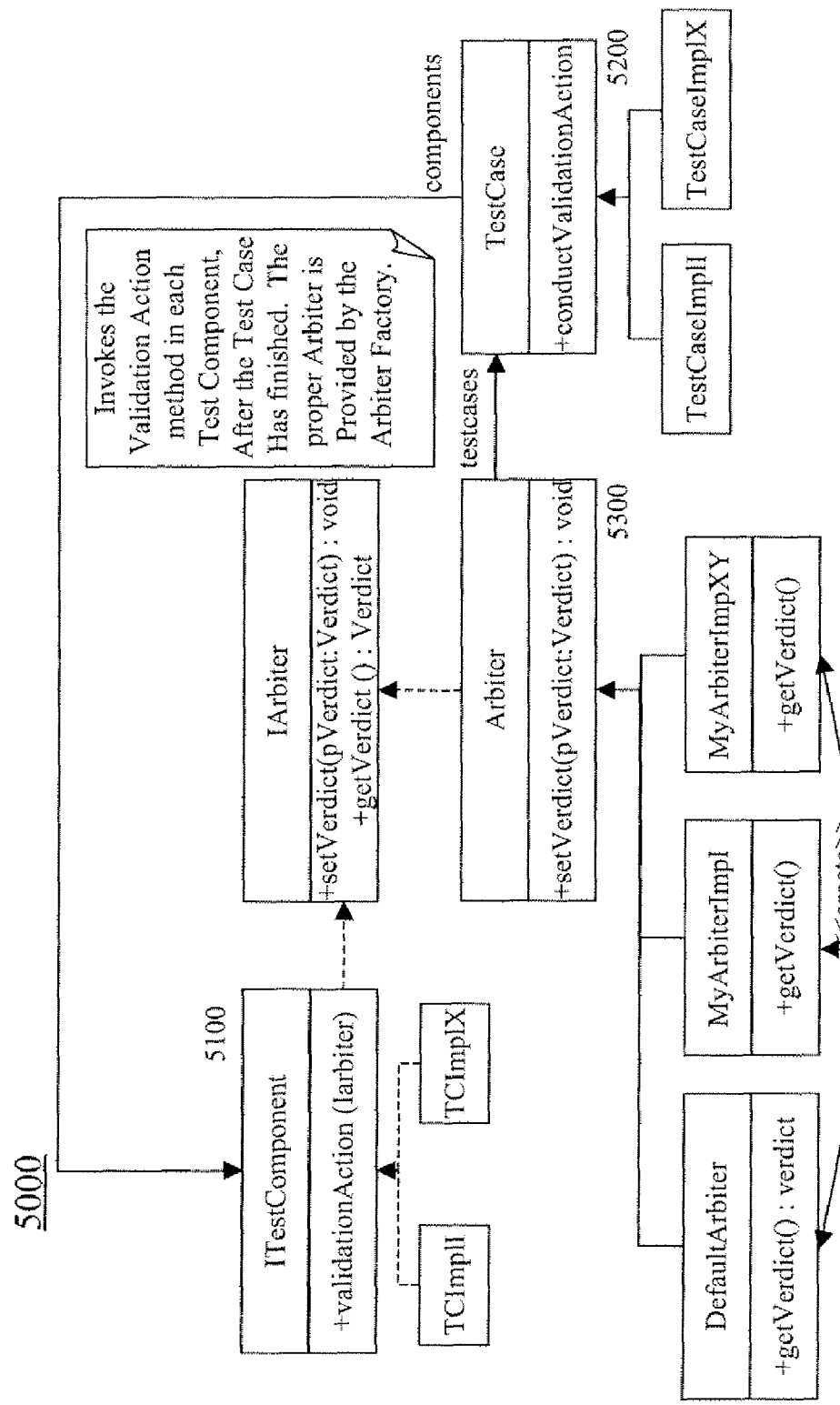
FIG. 5 is a block diagram of an exemplary embodiment of a system 5000.

FIG. 5 is a block diagram of an exemplary embodiment of a system 5000, which can comprise a test component 5100, a test case 5200, and/or an arbiter 5300.

Test case 5200 can invoke test component 5100 to conduct test case 5100. Each test component 5100 can conclude by performing a validation action. Arbiter 5200 can sample a verdict of each test component 5100 and determine an overall verdict for test case 5100. Certain exemplary embodiments can be adapted to utilize a default arbitration strategy. Certain exemplary embodiments can define an explicit arbitration strategy. Such a strategy can be bequeathed to the test application via a code generator GUI or via a command line.

Certain exemplary embodiments can automate a testing process using U2TP and/or TDE/UML. Certain exemplary embodiments can create and/or harness tests from a refined system specification. In certain exemplary embodiments, testing can be considered from a beginning of a software development project.

U2TP can enable an integration of testing in the development process, and TDE/UML can allow an automated creation of test cases based on system specification. U2TP and/or TDE/UML can provide a means to automatically harness the test cases supplied by TDE/UML In certain exemplary embodiments, test cases created by TDE/UML can be enhanced with information comprised by a data structure. In certain exemplary embodiments executable tests for exemplary software systems can be generated manually, automatically, and/or any combination thereof.

Using a manually enhanced input file, the code generator can be adapted to harness test cases in an XML file. Reworking generated code might involve relatively little effort.

In certain exemplary embodiments, the code generator equips TDE/UML with a test execution environment that empowers harnessing test cases created by TDE/UML. The generated test applications can be repeatedly executable and the generated Java code can comprise a concise structure that might allow manual enhancements of the generated tests.

Certain exemplary embodiments can comprise an integration of sequence diagrams into TDE/UML. Certain exemplary embodiments can be adapted for the modeling of explicit defaults.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, deed, function, step, and/or process and/or a portion thereof.

activity model—a graphical notation that describes, in terms of activity diagrams of the Unified Modeling Language (UML), specifications for one or more activities.

adapted to—suitable, fit, and/or capable of performing a specified function.

adjust—to change so as to match, fit, adapt, conform, and/or be in a more effective state.

algorithm—a method and/or procedure adapted to solve a problem and/or perform a function.

analyze—to review, study, examine, evaluate, and/or consider in detail and/or to subject to an analysis in order to discover essential features and/or meaning.

and/or—either in conjunction with or in alternative to.

apparatus—an appliance or device for a particular purpose applying to put to use for a purpose.

Arbiter—hardware, firmware, and/or software adapted to analyze verdicts regarding a system under test.

architectural information—data related to a test case structure and/or identification of components of a predetermined system.

associate—to relate, bring together in a relationship, map, combine, join, and/or connect.

associated with—related to.

attempt—to try to achieve.

automatically—acting and/or operating in a manner essentially independent of external human influence and/or control. For example, an automatic light switch can turn on upon "seeing" a person in its view, without the person manually operating the light switch.

based upon—determined in consideration of and/or derived from.

below—less than.

between—in a separating interval and/or intermediate to.

build—to prepare hardware, firmware, and/or software for testing and/or release to users.

can—is capable of, in at least some embodiments.

cause—to bring about, provoke, precipitate, produce, elicit, be the reason for, result in, and/or effect.

characteristic—a distinguishing feature.

compatible—an ability of one device or program to work with another device or program.

compile—to translate machine instructions from a high-level language into another language using a compiler.

component—a constituent element and/or part.

comprises includes, but is not limited to, what follows.

comprising—including but not limited to, what follows.

configure—to design, arrange, set up, shape, and/or make suitable and/or fit for a specific purpose.

constant—continually occurring; persistent; and/or unchanging.

constraint—a limitation.

create—to make, form, produce, generate, bring into being, and/or cause to exist.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

determination—an act of making or arriving at a decision.

determine—to obtain, calculate, decide, deduce, establish, and/or ascertain.

develop—to bring a software system into being.

device—an instrumentality adapted to a particular purpose.

distinct—discrete and/or readily distinguishable from all others.

during—at some time in a time interval.

each—every one of a group considered individually.

establish—to create, form, and/or set-up.

estimate—to calculate and/or determine approximately and/or tentatively.

execute to carry out a computer program and/or one or more instructions.

Extensible Markup Language (XML)—a simple, very flexible text format that serves as a standard for creating markup languages that describe the structure of data. It is not a fixed set of elements like HTML, but rather, it is like SGML (Standard Generalized Markup Language) in that it is a meta-language, or a language for describing languages. XML enables authors to define their own tags. XML is a formal specification of the World Wide Web Consortium.

file—a set of data, such as related data, that is kept together.

fifth—following a fourth thing in an ordering.

first—before one or more other things in an ordering.

fourth—following a third thing in an ordering.

from—used to indicate a source.

function—to perform as expected when applied.

further—in addition.

generate—to create, produce, render, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identification—evidence of identity, such as a moniker, description, designation, and/or characteristics, and/or something that uniquely and/or substantially uniquely identifies a person and/or thing.

image—an at least two-dimensional representation of an entity and/or phenomenon.

independent object—a hardware, firmware, and/or software item that can be individually selected and/or manipulated.

indicate—to show, mark, signal, signify, denote, evidence, evince, manifest, declare, enunciate, specify, explain, exhibit, present, reveal, disclose, and/or display.

indicative—serving to indicate.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initialize—to create, produce, render, give rise to, and/or bring into existence.

input/output (I/O) device—an input/output (I/O) device of an information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

knowledge—the ability to interpret information in order to extract greater meaning.

load—to bring a program and/or data into a predetermined memory device.

log—a record of events.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

manner—a mode of action.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

module—a set of instructions for operating a processor.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network, Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

obtain—to receive, get, take possession of, procure, acquire, calculate, determine, and/or compute.

operate to perform a function and/or to work.

originate—to give rise to and/or initiate.

output—(n) something produced and/or generated; data produced by an information device executing machine-readable instructions; and/or the energy, power, work, signal, and/or information produced by a system. (v) to provide, produce, manufacture, and/or generate.

packet—a generic term for a bundle of data organized in a specific way for transmission, such as within and/or across a network, such as a digital packet-switching network, and comprising the data to be transmitted and certain control information, such as a destination address.

parse—to analyze in order to associate groups of characters with the syntactic units of underlying grammar.

plurality—the state of being plural and/or more than one.

predetermined—determine, decide, or establish in advance.

prior—preceding in time.

probability—a quantitative representation of a likelihood of an occurrence.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

produce—to manufacture or make.

profile—a representation, outline, and/or description of an object, structure, and/or surface.

programming language—an artificial language used to write instructions that can be translated into machine language and then executed by a computer.

project—to calculate, estimate, or predict.

provide—to furnish, supply, give, convey, send, and/or make available.

receive—to gather, take, acquire, obtain, accept, get, and/or have bestowed upon.

recommend—to suggest, praise, commend, and/or endorse.

refine—to adjust, enhance, and/or improve.

related—connected to and/or associated with.

relative—considered with reference to and/or in comparison to something else.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

responsive—reacting to an influence and/or impetus.

result—an outcome and/or consequence of a particular action, operation, and/or course.

said when used in a system or device claim, an article indicating a subsequent claim term that has been previously introduced.

second following a first thing in an ordering.

select—to make and/or indicate a choice and/or selection from among alternatives.

sequence diagram—a graphical notation compliant with a standard of the Unified Modeling Language (UML) that indicates processes that execute in a determined order.

set—a related plurality of predetermined elements; and/or one or more distinct items and/or entities having a specific common property or properties.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, demultiplexed, decrypted, and/or decoded, etc.

software—instructions executable on a machine and/or processor to create a specific physical configuration of digital gates and machine subsystems for processing signals.

specification—a description or characterization.

statistical information—data that is determined based upon a collection, classification, analysis, and/or interpretation of facts. Exemplary statistics can comprise count, sum, sub-total, total, ratio, mean, average, running average, weighted average, mode, median, maximum, minimum, local maximum, local minimum, standard deviation, variance, correlation coefficient, control chart range, statistical analysis of variance parameter, statistical hypothesis testing value, and/or a deviation from a standard value, etc.

step—one of a series of actions, processes, or measures taken to achieve a goal.

store—to place, hold, retain, enter, and/or copy into and/or onto a machine-readable medium.

structure—a manner in which components are organized and/or form a whole.

substantially—to a considerable, large, and/or great, but not necessarily whole and/or entire, extent and/or degree.

system—a collection of mechanisms, devices, data, and/or instructions, the collection designed to perform one or more specific functions.

taking part—participating in.

test—(n.) an evaluation; (v.) to evaluate.

test case—a set of parameters and/or conditions adapted to serve as an input to an assessment of functionality in a hardware, firmware, and/or software system.

test case structure—how information in a test case is organized and/or related.

test generator—hardware firmware, and/or software adapted to refine a use case diagram.

third—following a second thing in an ordering.

threshold—a point that when exceeded produces a given effect or result.

transmit—to provide, furnish, supply, send as a signal, and/or to convey (e.g., force, energy, and/or information) from one place and/or thing to another.

Unified Modeling Language (UML)—an industry-standard language for specifying, visualizing, constructing, and/or documenting the artifacts of software systems standardized by the Object Management Group.

update—to change.

use case diagram—a graphical notation of a technique for capturing functional characteristics of systems and systems-of-systems as defined by the Unified Modeling Language (UML).

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/ or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

validate to corroborate and/or establish the validity and/or soundness of.

value—a measured, assigned, determined, and/or calculated quantity or quality for a variable and/or parameter.

verdict—an indicator of a level of performance of a system under test. Exemplary performance levels and/or indicators can include "pass", "fail", "78% in compliance", "no-go", "error", "warning", etc.

via by way of and/or utilizing.

weight—a value indicative of importance.

where—in a situation or position.

wherein—in regard to which; and; and/or in addition to.

whether—a conjunction used to introduce the first of two or more alternatives.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method, comprising:

receiving a defined use case diagram;

applying a test generator to said use case diagram, said test generator adapted to refine said use case diagram via an activity model and a sequence diagram to determine a test case, said test case adapted to test a predetermined software system;

automatically generating an Extensible Markup Language (XML) file indicative of said test case, said XML file comprising:

a structure adapted to obtain statistical information during a test of said predetermined software system;

a structure adapted to obtain output from said predetermined software system during said test;

architectural information related to a structure of said test case and an identification of components taking part in said test;

behavioral information regarding said test, the behavioral information including a set of concepts to specify objectives of the test and evaluation of the predetermined software system under test; and information regarding organization of an XML data structure associated with said XML file;

automatically generating machine instructions of said test case in a predetermined programming language via a plurality of modules, wherein the machine instructions are generated based on the XML file;

causing said machine instructions to be transmitted as a signal to an information device adapted to execute said machine instructions;

automatically validating said machine instructions;

executing said machine instructions via said information device;

automatically obtaining data from said predetermined software system responsive to said machine instructions;

automatically obtaining a verdict from said predetermined software system responsive to said machine instructions, said verdict adapted to be analyzed by an Arbiter, said verdict indicative of whether said predetermined software system functioned in a predetermined manner responsive said machine instructions; and rendering the verdict via a user interface.

2. A method, comprising:

via a signal, transmitting machine instructions adapted to cause a generation of a renderable verdict indicative of whether a predetermined software system functions in a predetermined manner, said machine instructions automatically generated via:

a first module adapted to parse and load an Extensible Markup Language XML file indicative of a test case, said test case comprising instructions adapted to test said predetermined software system;

a second module adapted to create a programming language independent object model of said test case;

a third module adapted to produce said machine instructions in a predetermined programming language by using be independent object model;

a fourth module adapted to compile and build said machine instructions associated with said test case, said fourth module adapted to initialize components of said test case in a file; and a fifth module adapted to execute said machine instructions, said fifth module adapted to log results obtained from said predetermined software system;

receiving a defined use case diagram, said use case diagram compatible with a Unified Modeling Language (UML) specification, said defined use case diagram adapted to generate said test case;

applying a test generator to a use case diagram, said test generator adapted to refine said use case diagram via an activity model and a sequence diagram to determine said test case;

automatically generating said XML file indicative of said test case, said XML file comprising:

a structure adapted to obtain statistical information during a test of said predetermined software system;

a structure adapted to obtain output from said predetermined software system during said test;

architectural information related to a structure of said test case and an identification of components taking part in said test;

behavioral information regarding said test; and information regarding organization of an XML data structure associated with said XML file;

causing said machine instructions to be transmitted as a signal an information device adapted to execute said machine instructions; and automatically validating said machine instructions, wherein said machine instructions are adapted to be executed via an information device comprising said predetermined software system, wherein said machine instructions are adapted to automatically obtain data from said predetermined software system, and wherein said machine instructions are adapted to automatically obtain said verdict from said predetermined software system responsive to said machine instructions, said verdict adapted to be analyzed by an Arbiter.

3. The method of claim 2, further comprising:

establishing a Unified Modeling Language (UML) testing profile adapted to test said predetermined software system, said testing profile comprising said test case.

4. The method of claim 2, further comprising:

prior to developing said predetermined software system, establishing a UML testing profile adapted to test said predetermined software system, said testing profile comprising said test case.

5. A computer program product, comprising:

a non-transitory computer readable storage medium having computer readable program code embodied therewith, the computer readable program code comprising:

computer readable program code configured to perform the steps of:

receiving a defined use case diagram;

applying a test generator to said use case diagram, said test generator adapted to refine said use case diagram via an activity model and a sequence diagram to determine a test case, said test case adapted to test a predetermined software system; and automatically generating an Extensible Markup Language (XML) file indicative of said test case, said XML file comprising:

a structure adapted to obtain statistical information during a test of said predetermined software system;

a structure adapted to obtain output from said predetermined software system during said test;

architectural information related to a structure of said test case and an identification of components taking part in said test;

behavioral information regarding said test, the behavioral information including a set of concepts to specify objectives of the test and evaluation of the predetermined software system under test; and information regarding organization of an XML data structure associated with said XML file.

6. The computer program product of claim 5, further comprising:

automatically generating machine instructions of said test case in a predetermined programming language via a plurality of modules comprising:

a first module adapted to parse and load the XML file;

a second module adapted to create a programming language independent object model of said test case;

a third module adapted to produce said machine instructions in a predetermined programming language by using the independent object model;

a fourth module adapted to compile and build said machine instructions associated with said test case, said fourth module adapted to initialize components of said test case in a file; and a fifth module adapted to execute said machine instructions, said fifth module adapted to log results obtained from said predetermined software system, wherein the machine instructions are generated based on the XML file.

7. The computer program product of claim 6, further comprising:

causing said machine instructions to be transmitted as a signal to an information device adapted to execute said machine instructions;

automatically validating said machine instructions;

executing said machine instructions via said information device;

automatically obtaining data from said predetermined software system responsive to said machine instructions;

automatically obtaining a verdict from said predetermined software system responsive to said machine instructions, said verdict adapted to be analyzed by an Arbiter, said verdict indicative of whether said predetermined software system functioned in a predetermined manner responsive said machine instructions; and rendering the verdict via a user interface.

8. A system, comprising:

a memory device for storing a program;

a processor in communication with the memory device, the processor operative with the program to:

receive a defined use case diagram;

apply a test generator to said use case diagram, said test generator adapted to refine said use case diagram via an activity model and a sequence diagram to determine a test case, said test case adapted to test a predetermined software system; and automatically generate an Extensible Markup Language (XML) file indicative of said test case, said XML file comprising:

a structure adapted to obtain statistical information during a test of said predetermined software system;

a structure adapted to obtain output from said predetermined software system during said test;

architectural information related to a structure of said test case and an identification of components taking part in said test;

behavioral information regarding said test, be behavioral information including a set of concepts to specify objectives of the test and evaluation of the predetermined software system under test; and information regarding organization of an XML data structure associated with said XML file.

9. The system of claim 8, wherein the processor is further operative with the program to:

automatically generate machine instructions of said test case in a predetermined programming language via a plurality of modules comprising:

a first module adapted to parse and load the XML file;

a second module adapted to create a programming language independent object model of said test case;

a third module adapted to produce said machine instructions in a predetermined programming language by using the independent object model;

a fourth module adapted to compile and build said machine instructions associated with said test case, said fourth module adapted to initialize components of said test case in a file; and a fifth module adapted to execute said machine instructions, said fifth module adapted to log results obtained from said predetermined software system; and a user interface adapted to render said verdict, wherein the machine instructions are generated based on the XML file.

10. The system of claim 9, wherein the processor is further operative with the program to:

cause said machine instructions to be transmitted as a signal to an information device adapted to execute said machine instructions;

automatically validate said machine instructions;

execute said machine instructions via said information device;

automatically obtain data from said predetermined software system responsive to said machine instructions;

automatically obtain a verdict from said predetermined software system responsive to said machine instructions, said verdict adapted to be analyzed by an Arbiter, said verdict indicative of whether said predetermined software system functioned in a predetermined manner responsive said machine instructions; and render the verdict via a user interface.

* * * * *